UNITED STATES PATENT OFFICE.

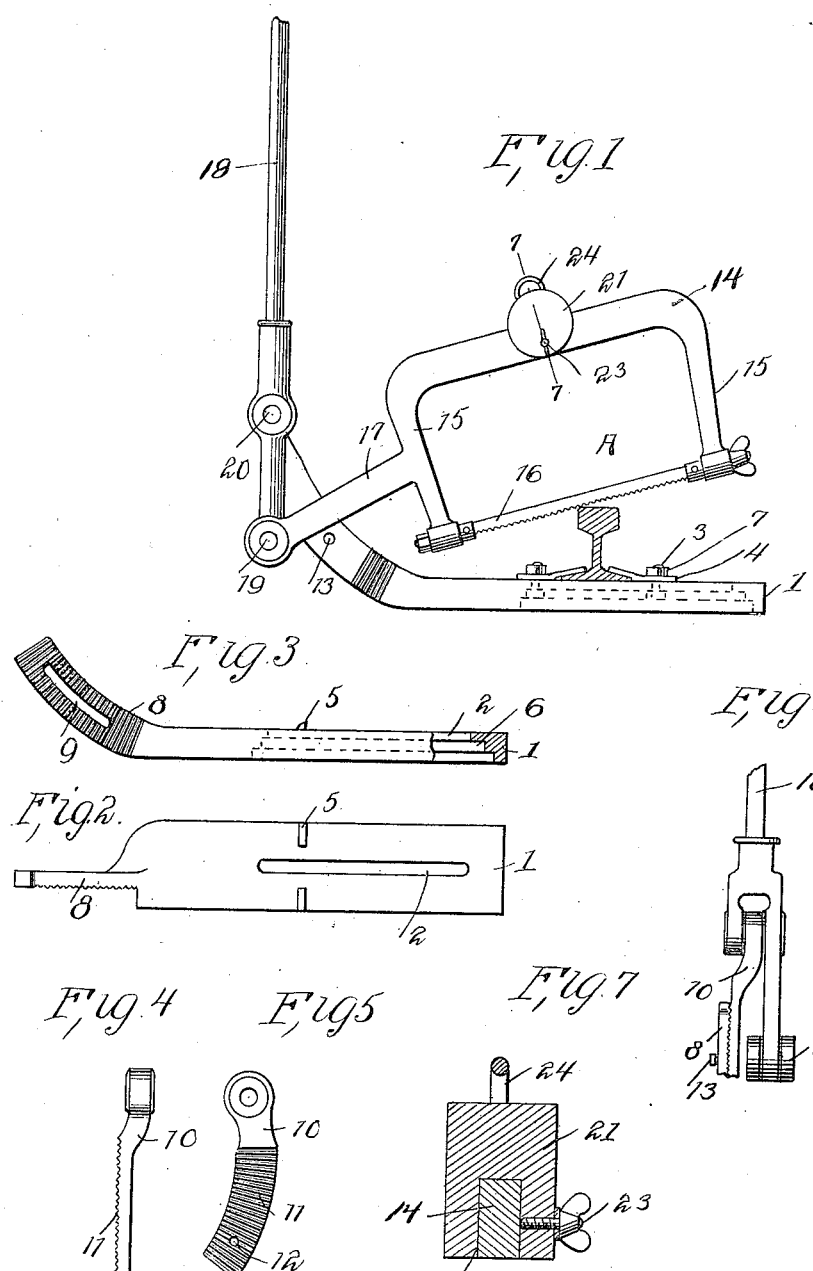

JOSUA H. SCHMIDT, OF YONKERS, NEW YORK.

DRAG-SAW.

993,884.

Specification of Letters Patent. Patented May 30, 1911.

Application filed July 22, 1910. Serial No. 573,346.

*To all whom it may concern:*

Be it known that I, JOSUA HERMAN SCHMIDT, a citizen of the United States of America, residing at Yonkers, in the county of Westchester and State of New York, have invented new and useful Improvements in Drag-Saws, of which the following is a specification.

This invention relates to drag saws, and has for its object to provide a simple portable machine operable by means of a hand lever for reciprocating a saw frame and so play across the work combined with means for clamping the frame of the machine to the work so as to render the saw frame movable with precision across and in contact with the work being operated upon and to provide means so that the saw frame can be adjusted vertically with respect to the work to be operated upon.

In the drawings, forming a portion of this specification and in which like numerals of reference indicate similar parts in the several views:—Figure 1 is a side elevation of the improved drag saw showing the same used in connection with a railroad rail. Fig. 2 is a plan view of the base section of the clamp-forming part of the machine. Fig. 3 is a side elevation thereof. Fig. 4 is an edge view of the lever support. Fig. 5 is a side view thereof. Fig. 6 is a detail end view of a portion of the machine showing the manner of connecting the lever with the lever support. Fig. 7 is a detail section taken on the line 7—7 of Fig. 1.

The machine consists of a clamp which comprises a base 1 of oblong form provided with a longitudinal slot 2 which is adapted to receive a plurality of clamping bolts 3 whereby a corresponding number of clips 4 are adjustably connected to the base 1, the said clips being adapted to engage and clamp the base of the rails illustrated at A in Fig. 1, against the base clamp as clearly disclosed. The slot 2 is of sufficient size to receive the shanks of the bolts 3 while the bottom of the base is recessed, as shown at 6, to allow the heads of the bolts to lie beneath the base and extend upward through the slot 2 and through the clips 4 so as to receive the clamping nuts 7. The base 1 is provided with transverse lugs 5 against which one side of the material to be operated upon may be placed so as to square the material with respect to the operating saw. At one end the base 1 is provided with an upwardly and outwardly curved ratchet arm 8 which is toothed at one side and formed to provide a longitudinally extending slot 9. A lever support 10 of a configuration conforming substantially with that of the arm 8 is provided and as illustrated, it is formed at one side with teeth 11 to interlock with the teeth on the arm 8. The lever support has formed therein an opening 12 to aline with the slot 9. A clamping bolt 13 extends through the opening 12 and through the slot 9 and its office is to hold the lever support in the desired adjusted position on the arm 8.

The drag saw frame is substantially U-shaped as shown in Fig. 1, and it comprises a drag 14 and depending arms 15 at opposite ends of the drag, which arms are equipped with holding devices at their ends to receive and secure in position a saw blade 16, the fastening means being of any preferred well known construction so as to admit of the removal and insertion of the saw blade as needed. The saw frame is provided at one end with an arm 17 whose outer extremity is forked so that its arms straddle the lower extremity of an operating lever 18. A pin 19 extends through the arms of the forked portion of the arm 17 and through the lower extremity of the said operating lever. The operating lever is pivoted, as shown at 20, to the upper extremity of the lever support 10. The drag 14 is rectangular and flat sided in cross section, so as to enable one or more weights 21 to be mounted thereon, one of said weights being illustrated in detail in cross section in Fig. 7 of the drawings, wherein it will be seen to comprise a slot 22 opening inward from the bottom thereof so as to enable the weight to straddle the drag of the frame. The weight also carries the binding screw 23 to effect the screw fastening on the drag, and as illustrated, each weight is provided with a suitable lifting handle 24.

A saw as described and shown herein is of a construction to permit the same to be used particularly in connection with rails or like material but in view of the construction of the base 1 the saw will be found most desirable for various uses. Through the provision of the adjustable saw-supporting arms the saw may not only be adjusted vertically according to the material to be operated upon, but it can be adjusted to lie at any angle with respect to the material.

I claim:

A machine of the class described comprising a base having a toothed portion, a lever supporting arm having a toothed portion for interlocking engagement with the toothed portion of the base, a clamping device extending through the arm and through the toothed portion of the base, a pivoted lever on the arm, and a saw-carrying frame above the base and operatively connected with the lever.

In testimony whereof I affix my signature in presence of two witnesses.

JOSUA H. SCHMIDT.

Witnesses:
R. G. JACKSON,
R. HALSEY JACKSON.

Copies of this patent may be obtained for five cents each, by addressing the "Commissioner of Patents, Washington, D. C."